Dec. 31, 1940.　　　　H. T. REEVE　　　　2,226,944
METHOD OF BONDING DISSIMILAR METALS
Filed Oct. 27, 1938
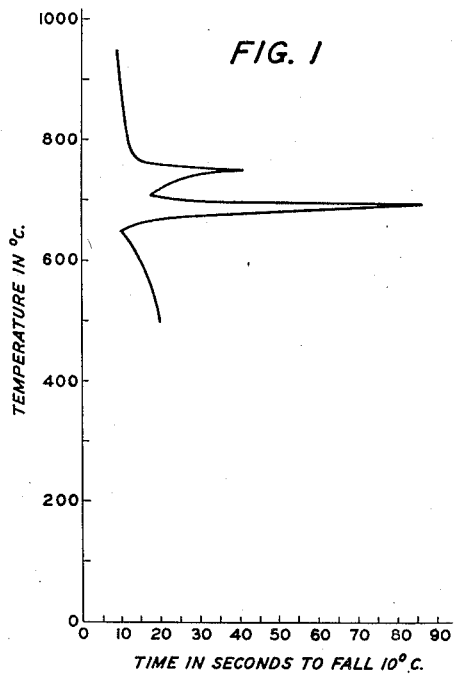
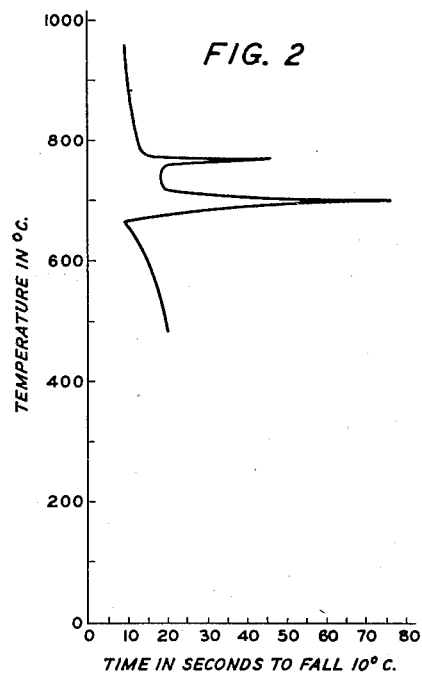
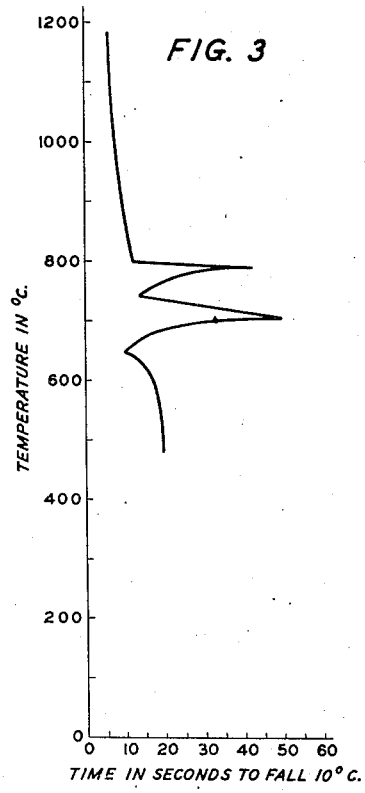
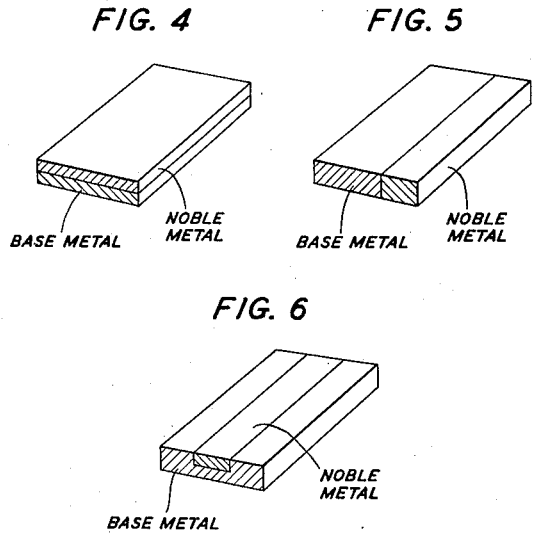
INVENTOR
H. T. REEVE
BY
B.H. Jackson
ATTORNEY Patented Dec. 31, 1940

2,226,944

UNITED STATES PATENT OFFICE 2,226,944

METHOD OF BONDING DISSIMILAR METALS

Howard T. Reeve, Millburn, N. J., assignor to Bell Telephone Laboratories, Incorporated, New York, N. Y., a corporation of New York Application October 27, 1938, Serial No. 237,196

9 Claims. (Cl. 113—112)

The present invention relates to methods for bonding dissimilar metals.

In the preparation of composite metal bodies, such as electrical contact points, it is often desirable to bond together two dissimilar metals. Thus it is often desirable in the formation of electrical contact bodies to bond a layer of a noble metal to a body of base metal in order to obtain the advantages of noble metal contact without incurring the expense of forming the entire body of noble metal and without incurring the disadvantages resulting from the inherent mechanical softness of most noble metals.

It is an object of the present invention to bond dissimilar metals under such conditions that excessive fusion and diffusion at the interface of the metals does not occur during the bonding operation. When bodies of dissimilar metals are autogenously bonded by heating them in contact with one another to bonding temperatures, difficulty is often encountered in obtaining a smooth, uniform line of union. In carrying out this type of bonding procedure it has been the practice to heat the bodies to a temperature at which a film of fluid alloy is formed at the surface of contact. It was thought necessary to heat to this temperature to insure the interdiffusion of the metals to form a strong and uniform bond. However, if the bodies are maintained at such a temperature for any substantial length of time the metals tend to dissolve in the fluid layer, forming a wider zone of alloy. This action is especially pronounced at the edges of the surfaces of contact, the edges being quickly dissolved away leaving a ragged, uneven line of bond. If the time of heating is limited to minimize this excessive fusion, the bond is likely to be weak and non-uniform.

Particular difficulty in this connection has been experienced when attempts have been made to form an autogenous bond between silver and brass or silver and bronze. If these metals are heated in contact for any appreciable length of time to a temperature sufficient to cause the formation of a molten alloy at the interface, an uneven and brittle diffusion zone is formed between the main bodies of metal. Such a bond is very unsatisfactory. For this reason solders are commonly used when it is desired to join these metals, in spite of the fact that the bond formed by the use of solder is often weak and the fact that the silver may become contaminated with the low melting solder.

By means of the method of the present invention the undesirable fusion is avoided, but not at the expense of the strength of the bond. This is accomplished by carefully controlling the bonding temperature within a predetermined and relatively narrow range below the temperature at which the metal at the interface exists in a substantially molten state but sufficiently high to permit bonding to take place within a reasonable time.

The method by which this permissible temperature range is determined will be described by way of example in connection with the bonding of a silver body to a body of brass. The particular brass used in this example is composed of 65 per cent copper and 35 per cent zinc. The first step in the determination of the temperature range consists of making a thermal analysis of an alloy which has a composition which is representative of the alloy which is assumed to be formed at the interface of the two metals when they are heated to bonding temperatures. In general, an alloy consisting of equal parts by weight of the two metals to be joined may be considered to be representative of at least a momentary composition of the alloy formed during bonding.

Therefore an alloy is formed consisting of 50 per cent by weight of silver and 50 per cent by weight of brass. This alloy is heated until it is completely molten, and it is then allowed to cool by simple radiation. During the cooling, the rate of cooling is measured periodically. This may be done in several manners. Thus the time required for the temperature to fall a given number of degrees, such as 10 degrees, may be measured at successive intervals. Alternatively, the temperatures at the expiration of successive uniform intervals of time may be determined. The latter method is usually preferable since measurements are more easily made of varying temperatures than of varying periods of time.

The results of these measurements are next plotted. If the periods of time required for successive equal periods of temperature drop have been measured directly, they may be plotted against temperature to give a temperature-inverse cooling rate curve. This type of curve may be more readily described by reference to the drawing, in which:

Fig. 1 represents a temperature-inverse cooling rate curve obtained from a molten alloy made up of 50 per cent silver and 50 per cent brass, the brass having a composition of 65 per cent copper and 35 per cent zinc;

Fig. 2 represents a temperature-inverse cooling rate curve obtained from a molten alloy made up of 50 per cent silver and 50 per cent brass, the brass having a composition of 72 per cent copper and 28 per cent zinc;

Fig. 3 represents a temperature-inverse cooling rate curve obtained from a molten alloy made up of 50 per cent silver and 50 per cent bronze, the bronze having a composition of 92 per cent copper and 8 per cent tin;

Fig. 4 represents an overlay of a noble metal bonded to a base metal;

Fig. 5 represents an edge-lay of a noble metal bonded to a base metal; and

Fig. 6 represents an inlay of a noble metal bonded to a base metal.

As has been stated above, the temperature-inverse rate curves shown in the drawing may be plotted directly if the proper measurements have been made. If, however, the temperatures have been measured at the expiration of successive uniform intervals of time, as is preferable, the temperatures may be plotted against time to form a time-temperature curve. From this curve may be measured the time required for successive uniform temperature drops. These values may then be plotted against temperature to give temperature-inverse cooling rate curves of the type shown in the drawing. Methods of obtaining the temperature-inverse cooling rate curves of the type discussed above are described, for example, in W. Rosenhain's "Introduction to Physical Metallurgy," third edition, London, 1935.

The temperature-inverse cooling rate curve is the preferred means of plotting the cooling data since it brings out much more sharply the changes taking place in the alloy during cooling than do the other forms of graphic representation. By reference to Fig. 1 it can be seen that the inverse cooling rate of an alloy containing 50 per cent silver and 50 per cent brass (65 Cu— 35 Zn) increases more or less uniformly until the temperature drops to the liquidus point at about 780 degrees. At this point some constituent of the alloy begins to freeze out, liberating considerable heat and therefore causing the inverse cooling rate to increase sharply. When the greater part of this constituent has solidified at about 750° C. much less heat is liberated due to solidification, and the inverse cooling rate decreases sharply. At about 710° C. a second component begins to freeze out and the inverse cooling rate again rises sharply, reaching a maximum at about 690° C. At this point the greater part of the second component has solidified and only a very small part of the alloy remains in a molten condition. As the small remainder solidifies the inverse cooling rate again decreases sharply until the solidus point is reached at about 650° C. After that the inverse cooling rate again increases more or less uniformly, affected only by the rate of radiation of heat from the solid alloy.

It has been discovered that if the bonding temperature of silver and brass of the composition stated is maintained below the lowest maximum point of inverse cooling rate (690° C.) and above the lowest minimum point of inverse cooling rate (650° C.) on the temperature-inverse cooling rate curve of a molten alloy made up of 50 per cent by weight of each of the two metals, a very satisfactory bond is obtained without any danger of the undesirable excessive fusion and within a reasonable length of time. Although sufficient diffusion of the metals may take place below about 650° C. to permit the formation of a bond, such a great length of time is required for this action to take place that it is impracticable to operate at temperatures below the range set forth. If temperatures above about 690° C. are employed, undesirable fusion begins to take place and becomes more and more pronounced as the temperature is raised. The preferable temperature for bonding silver to brass containing 65 per cent copper and 35 per cent zinc lies between about 660° C. and 680 C., or about 10° within each limit of the range set forth above. Within this lesser range the bonding is more rapid and there is less danger of diffusion due to prolonged heating. When prior attempts were made to form an autogenous bond between silver and brass of this composition, it was thought necessary to heat well in excess of 690° C. in order to obtain union of the two metals.

When bonding other metals, the same general procedure is employed. The temperature-inverse cooling rate curves to be used when bonding silver to brass having a higher copper content (72 per cent copper and 28 per cent zinc) or when bonding silver to bronze (92 per cent copper and 8 per cent tin) are shown in Figs. 2 and 3, respectively. In each case the curves were obtained from an alloy made up of equal parts by weight of the two metals to be joined. These curves have the same general shape as the curves shown in Fig. 1. In each case the desirable range of bonding temperature lies between the lowest maximum point of inverse cooling rate and the lowest minimum point of inverse cooling rate (final solidification point). In Fig. 2 this range lies between about 670° C. and 700° C. A more preferable range is between 680° C. and 690° C. In Fig. 3 the desirable range lies between about 650° C. and 710° C. A more preferable range is between about 660° C. and 700° C.

This method of determining the proper bonding temperature is applicable to metals other than those described above. It may be used with satisfactory results whenever it is desired to bond a noble metal to a base metal. Thus silver, gold, palladium, or alloys of these metals, such as the gold alloys of various carats and the palladium alloys as with copper and silver, may be joined by this method to base metals such as nickel, brass, bronze, German silver and iron and its alloys. As a specific example, a gold alloy containing 75 per cent gold and 25 per cent silver may be joined to a brass containing 85 per cent copper and 15 per cent zinc. Similarly, a palladium-copper alloy containing 60 per cent palladium and 40 per cent copper or a palladium-silver alloy containing 80 per cent palladium and 20 per cent silver may be joined to permalloy.

The actual bonding operation may be carried out in any suitable manner by heating adjacent bodies of the metals to be joined to a temperature within the range determined by the procedure described above and maintaining this temperature until bonding has taken place. Examples of the bodies which may be formed by such bonding are shown in Figs. 4 to 6. Fig. 4 shows a sheet of noble metal overlaid on a sheet of base metal. Fig. 5 shows an edge-lay of a noble metal on a body of base metal. Fig. 6 shows an inlay of a noble metal in a base metal body. Electrical contact points or contact arms can readily be formed from these bodies in any known and suitable manner, as, for instance, by punching or stamping.

Preferably, the bodies are forced together during heating by the application of mechanical pressure as, for instance, by clamping them tightly together. This applied force increases the number of points of contact and prevents buckling due to expansion of the two metals and insures the formation of a stronger bond within a shorter time. Preferably, the heating is carried out in an enclosed chamber under substantially inert or non-oxidizing conditions, as is more particularly described and claimed in the copending application of H. T. Reeve for Fabrication of duplex metal bodies, Serial No. 237,195, filed October 27, 1938. However, if desired, the heating operation may be carried out in air, although a much less satisfactory bond is usually obtained in this manner. Preferably, the non-oxidizing conditions are maintained by carrying out the heating under a high vacuum of the order of 1 millimeter of mercury absolute pressure. However, a higher pressure up to about 5 millimeters or higher may be used, with less satisfactory results in general than the lower pressure. An inert or non-oxidizing gas, such as hydrogen or nitrogen, may be used in place of a vacuum although usually with less satisfactory results. If the temperature is maintained within the proper range, there is no danger of excessive fusion taking place due to prolonged heating, so that the heating can be continued for as long a time as is necessary to form the desired bond.

After the composite bodies have been formed it may sometimes be desirable to roll them down to a lesser thickness before putting them to further use, as for the formation of contact elements. This rolling may be accomplished without difficulty due to the very strong bond which is formed.

Although the invention has been described in its more specific aspects, it is to be understood that it is of broad application, being limited in its scope only by the scope of the appended claims. In the following claims it is to be understood that the term metal refers to alloys as well as to individual metals.

What is claimed is:

1. The process of bonding dissimilar metals comprising heating adjacent bodies of said metals to a temperature which lies below about the lowest maximum point of inverse cooling rate and above about the final solidification point on the temperature-inverse cooling rate curve of an alloy made up of about equal proportions by weight of the metals to be joined, and maintaining a temperature within said range until a bond is formed between the two bodies.

2. The method of joining a noble metal to a base metal comprising heating adjacent bodies of said metals to a temperature which lies below about the lowest maximum point of inverse cooling rate and above about the lowest minimum point of inverse cooling rate on the temperature-inverse cooling rate curve of an alloy made up of about equal proportions by weight of the metals to be joined, and maintaining a temperature within said range until a bond is formed.

3. The method of bonding silver to brass which comprises heating adjacent bodies of said metals to a temperature which lies below about the lowest maximum point of inverse cooling rate and above about the lowest minimum point of inverse cooling rate on the temperature-inverse cooling rate curve of an alloy made up of about equal proportions by weight of the metals to be joined, and maintaining a temperature within said range until a bond is formed.

4. The method of bonding silver to bronze comprising heating adjacent bodies of said metals to a temperature which lies below about the lowest maximum point of inverse cooling rate and above about the lowest minimum point of inverse cooling rate on the temperature-inverse cooling rate curve of an alloy made up of about equal proportions by weight of the metals to be joined, and maintaining a temperature within said range until a bond is formed.

5. The method of bonding a metal containing palladium to a metal containing iron which comprises heating adjacent bodies of said metals to a temperature which lies below about the lowest maximum point of inverse cooling rate and above about the lowest minimum point of inverse cooling rate on the temperature-inverse cooling rate curve of a molten alloy made up of about equal proportions by weight of the metals to be joined, and maintaining a temperature within said range until a bond is formed.

6. The method of bonding a palladium-copper alloy to permalloy which comprises heating adjacent bodies of said metals to a temperature which lies below about the lowest maximum point of inverse cooling rate and above about the lowest minimum point of inverse cooling rate on the temperature-inverse cooling rate curve of a molten alloy made up of about equal proportions by weight of the metals to be joined, and maintaining a temperature within said range until a bond is formed.

7. The method of bonding bodies of dissimilar metals comprising determining the cooling rate of a molten alloy made up of about equal proportions by weight of the metals to be joined and then heating said bodies adjacent one another to a temperature which lies below about the temperature corresponding to the lowest minimum point of cooling rate and above about the temperature corresponding to the lowest maximum point of cooling rate of said alloy.

8. The method of bonding silver to brass containing about 72 per cent copper and about 28 per cent zinc, which comprises heating adjacent bodies of silver and said brass to a temperature between about 680° C. and about 690° C., and maintaining a temperature within said range until a bond is formed.

9. The method of bonding silver to bronze containing about 92 per cent copper and about 8 per cent tin which comprises heating adjacent bodies of said metals to a temperature between about 660° C. and about 700° C., and maintaining a temperature within said range until a bond is formed.

HOWARD T. REEVE.